United States Patent
Watanabe et al.

(10) Patent No.: US 8,473,716 B2
(45) Date of Patent: Jun. 25, 2013

(54) DISTRIBUTED PROCESSING SYSTEM, INFORMATION PROCESSING APPARATUS, AND DISTRIBUTED PROCESSING METHOD

(75) Inventors: Masahiro Watanabe, Kawasaki (JP); Toshiaki Hisada, Tokyo (JP); Seiryo Sugiura, Tokyo (JP); Takumi Washio, Ibaraki (JP); Jun-ichi Okada, Chiba (JP)

(73) Assignees: Fujitsu Limited, Kawasaki (JP); The University of Tokyo, Tokyo (JP)

( * ) Notice: Subject to any disclaimer, the term of this patent is extended or adjusted under 35 U.S.C. 154(b) by 380 days.

(21) Appl. No.: 12/832,349

(22) Filed: Jul. 8, 2010

(65) Prior Publication Data

US 2011/0007083 A1 Jan. 13, 2011

(30) Foreign Application Priority Data

Jul. 9, 2009 (JP) .................................. 2009-162329

(51) Int. Cl.
*G06F 15/00* (2006.01)
*G06F 15/76* (2006.01)
*G06F 15/16* (2006.01)

(52) U.S. Cl.
USPC ............................................ 712/28; 345/502

(58) Field of Classification Search
USPC ...................... 345/501, 502; 709/226; 712/28
See application file for complete search history.

(56) References Cited

U.S. PATENT DOCUMENTS

| | | | |
|---|---|---|---|
| 7,065,249 B2 * | 6/2006 | Fushiki et al. | 382/167 |
| 7,454,659 B1 | 11/2008 | Gaudette et al. | |
| 7,535,473 B2 * | 5/2009 | Antoine | 345/502 |
| 2004/0117358 A1 * | 6/2004 | von Kaenel et al. | 707/3 |
| 2007/0028242 A1 | 2/2007 | Martin et al. | |
| 2008/0021951 A1 | 1/2008 | Lurie et al. | |
| 2008/0028405 A1 | 1/2008 | Martin et al. | |

FOREIGN PATENT DOCUMENTS

| | | |
|---|---|---|
| JP | 6-28333 | 2/1994 |
| JP | 2003-233600 | 8/2003 |

OTHER PUBLICATIONS

Extended European Search Report, mailed Oct. 7, 2010, in corresponding European Application No. 10168513.9.
Japanese Patent Office Notice of Reasons for Rejection dated Feb. 19, 2013 for corresponding Japanese Patent Application No. 2009-162329.
"Interactive Scientific Visualization Using Parallel Redundant Prediction Method", Tetsuro Ogi et al., TAO Gifu MVL Research Center, Intelligent Modeling Laboratory, The University of Tokyo, Collected Papers C of Japan Machine Society, Japan Machine Society Corporation, Jul. 25, 2000, vol. 66, No. 647, p. 225-232.
"Parallel 3D LLIC Rendering by the Volume Graphics (VG) Cluster", Shigeru Muraki, et al., Research Report of Information Processing Society of Japan, Information Processing Society of Japan Corporation, vol. 2002, No. 77, pp. 67-72, Aug. 8, 2002.

* cited by examiner

*Primary Examiner* — Jacinta M Crawford
(74) *Attorney, Agent, or Firm* — Staas & Halsey LLP (57) ABSTRACT

According to an aspect of the embodiment, a user apparatus transmits a parameter on generation of drawing data to each of drawing data generation apparatuses through a network, to assign generation processing of the drawing data to each of drawing data generation apparatuses. The user apparatus receives the drawing data generated based on the parameter by each of the plurality of drawing data generation apparatuses through the network, and displays the received drawing data. The user apparatus changes the parameter corresponding to the displayed drawing data, and displays a new drawing data corresponding to the changed parameter.

8 Claims, 9 Drawing Sheets

FIG. 9

DISTRIBUTED PROCESSING SYSTEM, INFORMATION PROCESSING APPARATUS, AND DISTRIBUTED PROCESSING METHOD

CROSS-REFERENCE TO RELATED APPLICATION

This application is based upon and claims the benefit of priority of the prior Japanese Patent Application No. 2009-162329, filed on Jul. 9, 2009, the entire contents of which are incorporated herein by reference.

FIELD

The embodiments discussed herein are related to a distributed processing system, an information processing apparatus, and a distributed processing method.

BACKGROUND

Figure 9:
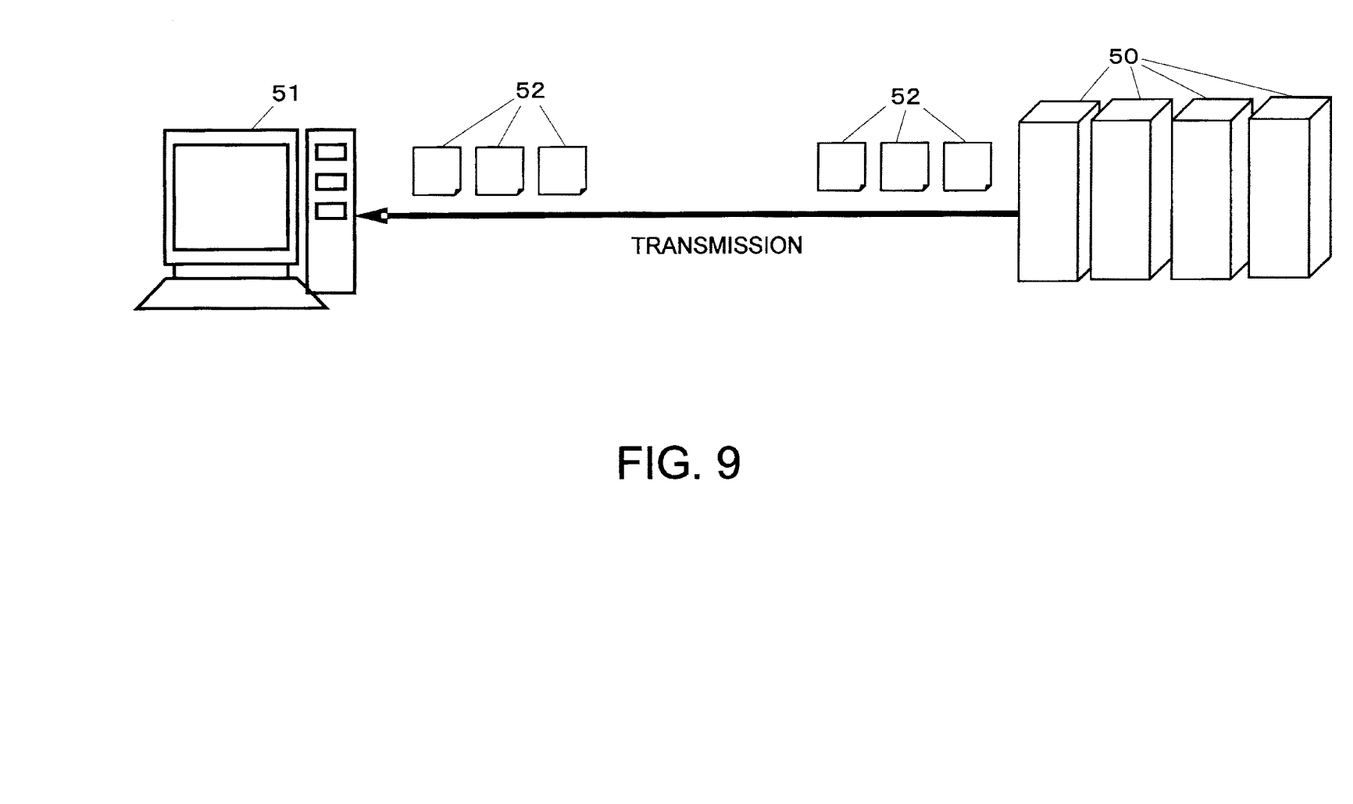
FIG. 9 is a diagram illustrating a conventional system.

Conventionally, as illustrated in FIG. 9, a system is known in which a large scale computer 50, for example, executes a simulation of a biological body, a nanotechnology, an environment, or the like, and the large scale computer 50 transmits simulation data 52 indicating an execution result of simulation to an information processing apparatus 51 operated by a user, and the information processing apparatus 51 displays the transmitted simulation data 52. Here, the above simulation data 52 includes a plurality of time information, and a plurality of parameters on drawing. For example, in this case, the information processing apparatus 51 generates drawing data corresponding to each of the time information and the plurality of parameters on the drawing, both of which are included in the above simulation data 52, and displays the generated drawing data.

Further, a visualization system is proposed, which analyzes and executes a combination of processing in which all processing times from a start to an end of visualization is minimized.

For example, Patent Document 1 is a prior art document which discloses a technique on the visualization system.

Patent Document 1: Japanese Laid-Open Patent Publication No. 6-28333

However, in the system illustrated in FIG. 9, single information processing apparatus 51 generates the drawing data corresponding to each of the time information and the plurality of parameters on the drawing included in the above simulation data 52, and displays the generated drawing data. Thus, it takes a time to execute display processing for the drawing data, and it takes a longer time until the user starts monitoring the simulation result. Further, in the above system, the displayed or illustrated drawing data is not interactively updated based on changing the parameter on the generation of the displayed drawing data.

SUMMARY

According to an aspect of the embodiment, a distributed processing system includes a plurality of drawing data generation apparatuses, and an information processing apparatus connected to the plurality of drawing data generation apparatuses through a network. The information processing apparatus further includes: a processing assignment unit transmitting a parameter on generation of drawing data to each of the plurality of drawing data generation apparatuses through the network to assign generation processing of the drawing data to each of the plurality of drawing data generation apparatuses; a display unit receiving the drawing data generated based on the parameter by each of the plurality of drawing data generation apparatuses through the network, and displaying the received drawing data; and a parameter change unit changing the parameter corresponding to the displayed drawing data. The display unit displays a new drawing data corresponding to the changed parameter.

According to the above aspects of the embodiments, in the distributed processing system, the information processing apparatus, and the distributed processing method, it becomes possible to quickly display the drawing data, and to interactively update the displayed drawing data corresponding to the parameter on the generation of the drawing data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present invention will be explained with reference to accompanying drawings.

Figure 1:
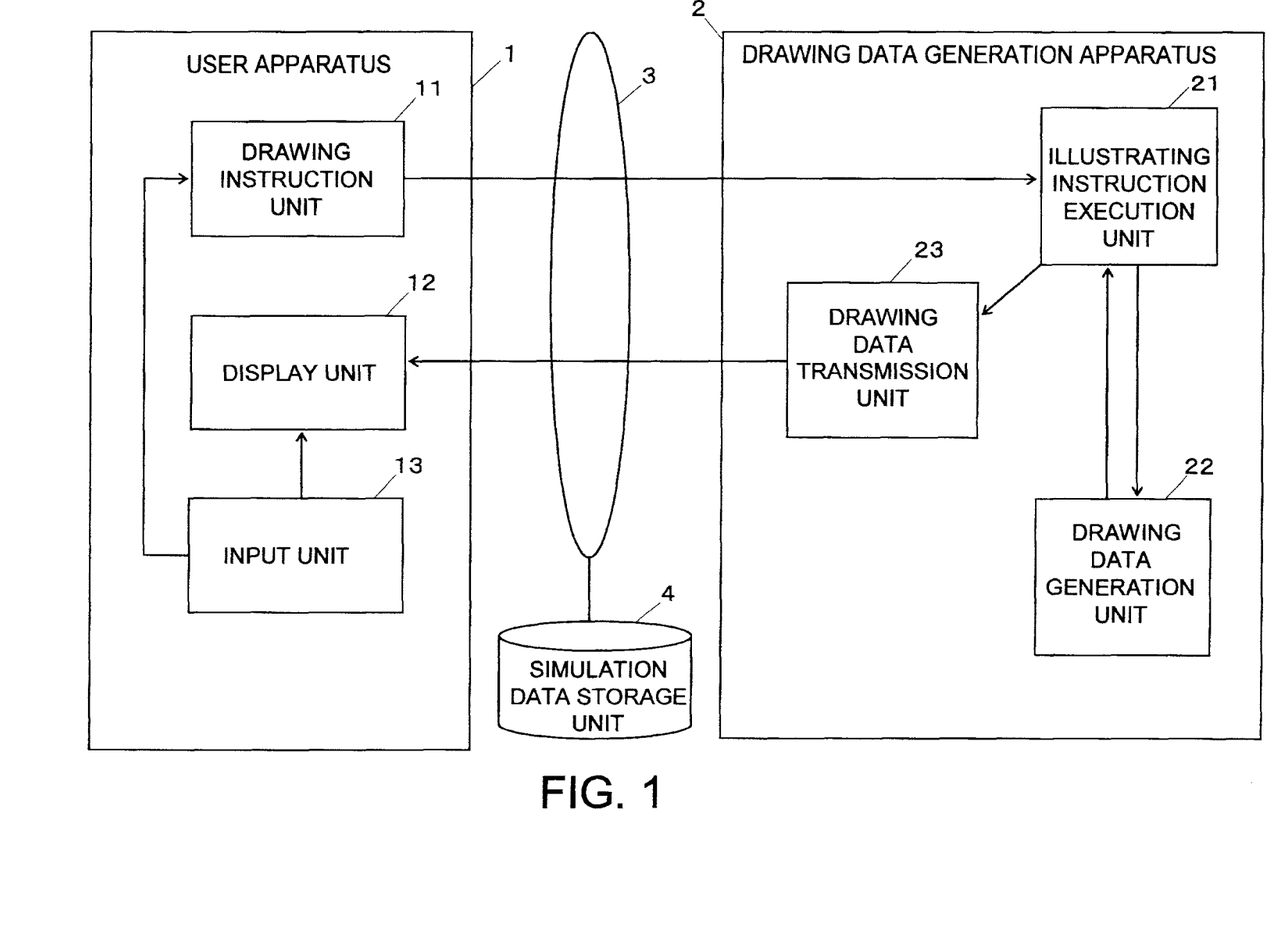
FIG. 1 is a diagram illustrating an example of a structure of a distributed processing system of the present embodiment.

FIG. 1 is a diagram illustrating an example of a structure of a distributed processing system of the present embodiment.

Figure 2:
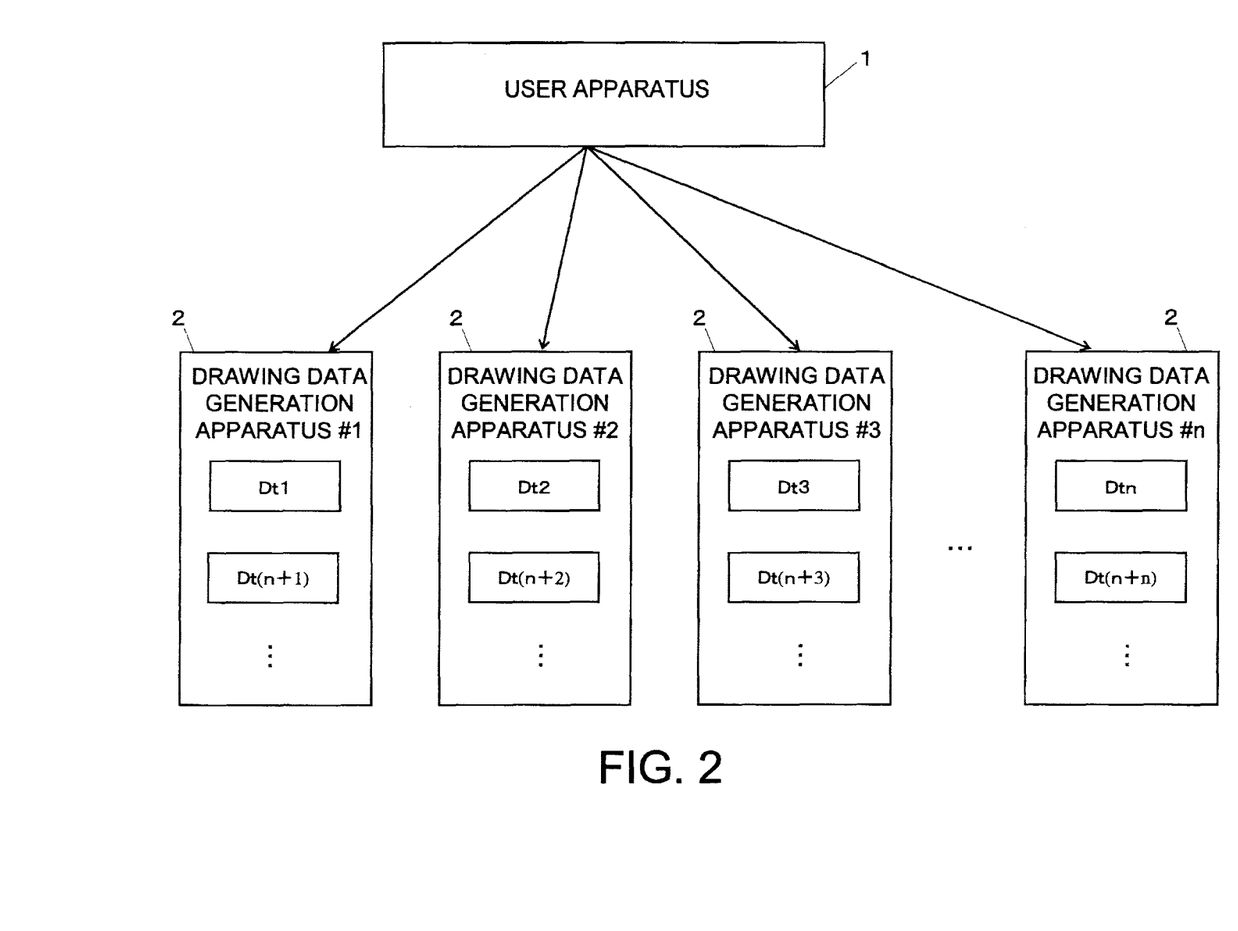
FIG. 2 is a diagram describing an example of assigning of generation processing of drawing data to each of drawing data generation apparatuses.

The distributed processing system of the present embodiment includes single user apparatus 1, a plurality of drawing data generation apparatuses 2, a network 3, and single simulation data storage unit 4. The simulation data storage unit 4 is commonly provided for the plurality of drawing data generation apparatuses 2, and is a storage apparatus, such as a storage server, connected to the network 3, for example. The network 3 connects between the user apparatus 1 and each of the plurality of drawing data generation apparatuses 2, and connects between each of the plurality of drawing data generation apparatuses 2 and the simulation data storage unit 4. While FIG. 1 illustrates only single drawing data generation apparatus 2 the plurality of drawing data generation apparatuses 2 are actually provided, as illustrated in FIG. 2.

The user apparatus 1 is, for example, an information processing apparatus which is used by a user such as a researcher. The user apparatus 1 assigns generation processing of drawing data to each of the plurality of drawing data generation apparatuses 2, and displays the drawing data generated by each of the plurality of drawing data generation apparatuses 2. The drawing data generation apparatus 2 is a processing apparatus which executes the generation processing of the drawing data, which is assigned by the user apparatus 1 to the own apparatus, to generate the drawing data, and transmits the generated drawing data to the user apparatus 1 through the network 3. The drawing data generation apparatus 2 executes, for example, drawing data generation processing such as equivalent surface generating, volume rendering, and surface rendering. In the present embodiment, it is assumed that it is predetermined that which drawing data generation apparatus 2 executes which drawing data generation processing.

The user apparatus 1 includes a drawing instruction unit 11, a display unit 12, and an input unit 13. The drawing instruction unit 11 includes a function of a processing assignment unit, which transmits an extracting instruction and a data type parameter corresponding to the extracting instruction, and an illustrating instruction and an illustrating parameter corresponding to the illustrating instruction to each of the plurality of drawing data generation apparatuses 2 through the network 3, to assign the generation processing of the drawing data to each of the plurality of drawing data generation apparatuses 2.

The extraction instruction is an instruction on the generation of the drawing data. The extracting instruction is an instruction for instructing an illustrating instruction execution unit 21 provided in the drawing data generation apparatus 2 to extract simulation data from the simulation data storage unit 4. The simulation data storage unit 4 stores the simulation data used for the generation of the drawing data. The simulation data is data which is a source for each of the plurality of drawing data generation apparatuses 2 to generate the drawing data. And, the simulation data is data indicating an execution result of the simulation, which is executed by a predetermined simulation apparatus, for example, on a biological body, a nanotechnology, an environment, or the like.

The illustrating instruction is an instruction on the generation of the drawing data. The illustrating instruction is an instruction for instructing the illustrating instruction execution unit 21 provided in the drawing data generation apparatus 2 to generate the drawing data.

The data type parameter is a parameter on generation of the drawing data. The data type parameter is a parameter for indicating time information and a data type of the simulation data. For example, the data type is a data type of data having scalar quantity such as absolute values of pressure and stress, vector data such as velocity, tensor data such as stress, frequency data, or polygon data. It is assumed that the simulation data of the present embodiment includes the plurality of the time information and the plurality of data types.

The illustrating parameter is a parameter on generation of the drawing data. The illustrating parameter includes a transfer function of an input-output system on the generation of the drawing data and viewing point information on the generation of the drawing data. The transfer function of the input-output system on the generation of the drawing data defines a property of the drawing data to be generated. When the drawing data generation processing executed by the drawing data generation apparatus 2 is the volume rendering, the transfer function is, for example, a histogram indicating a brightness distribution of the drawing data, a color map of the drawing data, transparency of the drawing data, and the like. When the drawing data generation processing executed by the drawing data generation apparatus 2 is the equivalent surface generating, the transfer function is, for example, a threshold of the brightness (threshold of the equivalent surface) which is a criterion of the equivalent surface generating, the transparency of the equivalent surface, and the like. Meanwhile, the threshold of the equivalent surface is larger, a size of an area of the equivalent surface generated based on the threshold becomes smaller. The viewing point information is information indicating which direction the drawing data to be generated is viewed from.

The drawing instruction unit 11 transmits the data type parameter including the time information, which is different from the time information included in the data type parameter transmitted to another drawing data generation apparatus, to each of the plurality of drawing data generation apparatus 2. Thereby, the drawing instruction unit 11 causes each of the plurality of drawing data generation apparatuses 2 to execute the generation processing of the drawing data corresponding to the time information included in the data type parameter transmitted to the each drawing data generation apparatus 2.

For example, the drawing instruction unit 11 transmits the data type parameter, which includes the time information of the time t1 and the data type of the pressure, and the extracting instruction, to the first drawing data generation apparatus 2. The drawing instruction unit 11 transmits the illustrating parameter, which includes the transfer function of the transparency "0" and of the threshold "10" of the equivalent surface and the viewing point information, and the illustrating instruction, to the first drawing data generation apparatus 2. On the other hand, the drawing instruction unit 11 transmits the data type parameter, which include the time information of the time t2 and t3, respectively, and the data type of the pressure, and the extracting instruction, to the second and third drawing data generation apparatuses 2. The drawing instruction unit 11 transmits the same illustrating parameter as the illustrating parameter transmitted to the first drawing data generation apparatus 2 and the illustrating instruction, to the second and third drawing data generation apparatuses 2.

The illustrating instruction execution unit 21 of each of the plurality of drawing data generation apparatuses 2 receives the extracting instruction and the data type parameter, and the illustrating instruction and the illustrating parameter, from the drawing instruction unit 11. In response to this receiving, the illustrating instruction execution unit 21 of each of the plurality of drawing data generation apparatuses 2 extracts simulation data corresponding to the time information included in the data type parameter transmitted to the own apparatus from the simulation data storage unit 4. The illustrating instruction execution unit 21 of each of the plurality of drawing data generation apparatuses 2 generates drawing data based on the extracted simulation data, and the illustrating parameter transmitted to the own apparatus.

For example, the first, second, and third drawing data generation apparatuses 2 generate the equivalent surfaces corresponding to the times t1, t2, and t3, which are the drawing data, based on the simulation data corresponding to the times t1, t2, and t3 and the illustrating parameter, respectively. The equivalent surfaces corresponding to the times t1, t2, and t3 are the equivalent surfaces corresponding to the threshold "10" of the equivalent surface and the transparency "0", and are the equivalent surfaces viewed from the direction indicated by the transmitted viewing point information.

The display unit 12 receives the drawing data, which is generated and is transmitted to the user apparatus 1 by each of the plurality of drawing data generation apparatuses 2, stores the received drawing data in a predetermined drawing data storage unit, and displays each drawing data stored in the drawing data storage unit in order of the time information corresponding to each drawing data. The drawing data storage unit is provided in the display unit 12. For example, the display unit 12 continuously displays each of the equivalent surfaces corresponding to the above times t1, t2, and t3 in order of the times. As described above, by continuously displaying each drawing data in order of the time information corresponding to each drawing data, the drawing data can be displayed as a moving image.

Meanwhile, when the drawing data corresponding to the time which exists between two times is not stored in the drawing data storage unit, the display unit 12 may execute interpolation processing by using the drawing data corresponding to each of the above two times, may generate the drawing data corresponding to the time between the two times, and may display the generated drawing data.

Differently from the above-mentioned embodiment, the drawing instruction unit 11 may execute the following processing.

That is, the drawing instruction unit 11 may transmit the data type parameter including the same time information (for example, t1), and the illustrating parameter including the transfer function, which is different from the transfer function included in the illustrating parameter transmitted to another drawing data generation apparatus 2, to each of the plurality of drawing data generation apparatus 2. Thereby, the drawing instruction unit 11 causes each of the plurality of drawing data generation apparatuses 2 to execute the generation processing of the drawing data corresponding to the time information included in the data type parameter transmitted to each of the plurality of drawing data generation apparatuses 2, and the transfer function included in the illustrating parameter transmitted to the own apparatus. Then, the display unit 12 displays drawing data corresponding to one or more selected transfer function in each drawing data corresponding to the same time information received from each of the plurality of drawing data generation apparatuses 2.

For example, the drawing instruction unit 11 transmits the data type parameter, which includes the time information of the time t1 and the data type of the pressure, and the extracting instruction, to the first, second, and third drawing data generation apparatuses 2. The drawing instruction unit 11 transmits the illustrating parameter, which includes the transfer function of the transparency "0" and of the threshold "10" of the equivalent surface and the viewing point information, and the illustrating instruction, to the first drawing data generation apparatus 2. The drawing instruction unit 11 transmits the illustrating parameter, which includes the transfer function of the transparency "5" and of the threshold "15" of the equivalent surface and the viewing point information, and the illustrating instruction, to the second drawing data generation apparatus 2. The drawing instruction unit 11 transmits the illustrating parameter, which includes the transfer function of the transparency "10" and of the threshold "20" of the equivalent surface and the viewing point information, and the illustrating instruction, to the third drawing data generation apparatus 2.

As a result, the illustrating instruction execution unit 21 of each of the plurality of drawing data generation apparatuses 2 receives the extracting instruction and the data type parameter, and the illustrating instruction and the illustrating parameter from the drawing instruction unit 11. In response to this receiving, the illustrating instruction execution unit 21 of each of the plurality of drawing data generation apparatuses 2 extracts the simulation data corresponding to the time t1 from the simulation data storage unit 4. The drawing instruction unit 11 generates the drawing data corresponding to the transfer function and the viewing point information based on the simulation data extracted from the simulation data storage unit 4, and the transfer function and the viewing point information both of which are included in the illustrating parameter transmitted to the own apparatus.

Specifically, the first drawing data generation apparatus 2 generates the equivalent surface, which corresponds to the time t1, the transparency "0" and the threshold "10" of the equivalent surface, and which is viewed from the direction indicated by the transmitted viewing point information, as the drawing data. The second drawing data generation apparatus 2 generates the equivalent surface, which corresponds to the time t1, the transparency "5" and the threshold "15" of the equivalent surface, and which is viewed from the direction indicated by the transmitted viewing point information, as the drawing data. The third drawing data generation apparatus 2 generates the equivalent surface, which corresponds to the time t1, the transparency "10", and the threshold "20" of the equivalent surface, and which is viewed from the direction indicated by the transmitted viewing point information, as the drawing data. The display unit 12 displays equivalent surface corresponding to the transfer function selected by the input unit 13 in each of the equivalent surfaces, which are received from each of the plurality of drawing data generation apparatuses 2 and correspond to the time t1.

Returning to FIG. 1, the input unit 13 executes information input processing according to an instruction input from a user. For example, the input unit 13 inputs the data type parameter and the illustrating parameter, both of which are transmitted by the drawing instruction unit 11 to the drawing data generation apparatus 2. For example, the input unit 13 accepts an input for selecting the transfer function in response to an input of a selection by an operator to cause the display unit 12 to display drawing data corresponding to one or more selected transfer function. The input unit 13 inputs information for instructing to change the viewing point information, the time information, or the illustrating parameter according to an operation by the user on a display screen 100, a time change slide bar 108, or a parameter sweep screen 109, which will be described later as referring to FIG. 3.

That is, the input unit 13 includes a function of a parameter change unit changing parameters (time information, viewing point information, and illustrating parameter) corresponding to the displayed drawing data. According to the present embodiment, when the time information is changed according to an operation on the time change slide bar 108 by the user, the display unit 12 displays a new drawing data corresponding to the above changed time on a display screen. The input unit 13 inputs operation information according to the operation on a frame-back button 101 to a frame-feed button 107, which will be described later as referring to FIG. 3.

Differently from the above-described embodiment, in the user apparatus 1, the following processing may be executed.

For example, there is a case in which the viewing point information is changed according to a change operation on a viewing point of the above display screen 100, and a frame-feed operation is instructed by pushing down the frame-feed button 107, by the user, which will be described later as referring to FIG. 3. In this case, the drawing instruction unit 11 transmits the changed viewing point information to the drawing data generation apparatuses 2, to which the generation of the drawing data corresponding to times after the time when the viewing point information is changed are assigned. In addition, the drawing instruction unit 11 causes each of the plurality of drawing data generation apparatuses 2 to generate a new drawing data whose viewing point are changed. Then, the display unit 12 continuously displays the generated new drawing data in the display screen 100 in a frame-feed mode in order of the times corresponding to the new drawing data.

Figure 3:
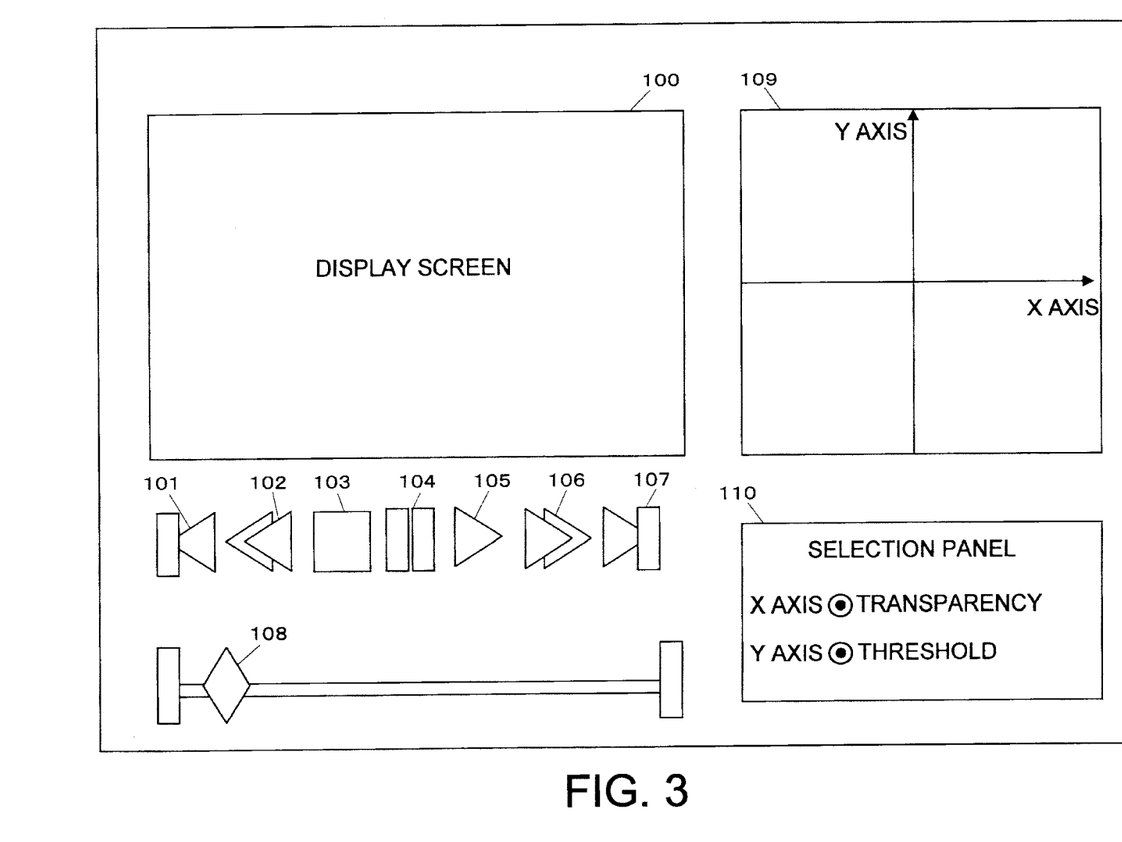
FIG. 3 is a diagram illustrating an example of a screen display of the drawing data to a user apparatus.

Further, for example, there is a case in which the illustrating parameter is changed according to the change operation of the illustrating parameter on the parameter sweep screen 109 illustrated in FIG. 3. In this case, the drawing instruction unit 11 transmits the changed illustrating parameter to the drawing data generation apparatus 2 in charge of the generation of the drawing data corresponding to the changed illustrating parameter. In addition, the drawing instruction unit 11 causes the drawing data generation apparatuses 2, to which the illustrating parameter is transmitted, to generate a new drawing data corresponding to the transmitted illustrating parameter. Then, the display unit 12 displays the generated new drawing data on the display screen.

The processing of each processing unit provided in the above user apparatus 1 is realized a CPU provided in a computer and a program executed on the CPU. The program can be stored in a recording medium which can be read by the computer, and is provided as being recorded in the recording medium, or is provided in transmitting and receiving which utilize a network through a communication interface.

Returning to FIG. 1, each of the plurality of drawing data generation apparatuses 2 includes the illustrating instruction execution unit 21, a drawing data generation unit 22, and a drawing data transmission unit 23. The illustrating instruction execution unit 21 receives the extracting instruction as well as the data type parameter, and the illustrating instruction as well as the illustrating parameter, from the drawing instruction unit 11 of the user apparatus 1 through the network 3. The illustrating instruction execution unit 21 extracts simulation data corresponding to the received data type parameter from the simulation data storage unit 4. The illustrating instruction execution unit 21 transfers the simulation data extracted from the simulation data storage unit 4 and the illustrating parameter received from the drawing instruction unit 11 to the drawing data generation unit 22 and causes the drawing data generation unit 22 to generate the drawing data corresponding to the illustrating parameter, according to the received illustrating instruction.

The drawing data generation unit 22 is, for example, hardware for graphic. The drawing data generation unit 22 generates the drawing data corresponding to the transferred illustrating parameter based on the simulation data and the illustrating parameter, both of which are transferred from the illustrating instruction execution unit 21. The drawing data transmission unit 23 transmits the drawing data generated by the drawing data generation unit 22 to the user apparatus 1 through the network 3.

FIG. 2 is a diagram describing an example of assigning of the generation processing of the drawing data to each of drawing data generation apparatuses.

For example, it is assumed that the distributed processing system of the present embodiment includes the "n" (#1 to #n) drawing data generation apparatuses 2. The use apparatus 1 assigns the generation of the drawing data to the drawing data generation apparatuses 2 in a striping method, for example. In the example illustrated in FIG. 2, the generation of the drawing data (Dt1 to Dtn), which correspond to each time of the time t1 to the time tn, is sequentially assigned to the drawing data generation apparatuses #1 to #n. And, the generation of the drawing data (Dt(n+1) to Dt(n+n)), which correspond to each time after the time t(n+1), is sequentially assigned to the drawing data generation apparatuses #1 to #n.

Meanwhile, the user apparatus 1 may assign the generation processing of the drawing data to each of the plurality of drawing data generation apparatuses 2 in a method other than the striping method. For example, the user apparatus 1 may assign the drawing data corresponding to the time t1 to the time t(m/n) to the drawing data generation apparatus #1, and the drawing data corresponding to the time t(m/n+1) to the time t(2m/n) to the drawing data generation apparatus #2. Here, the number "m" is a total of the times corresponding to the generated drawing data.

FIG. 3 is a diagram illustrating an example of a screen display of the drawing data to the user apparatus.

In FIG. 3, numeral 100 denotes a display screen on which the drawing data is displayed. Numerals 101, 102, 103, 104, 105, 106, and 107 denote the frame-back button, a rewind back button, a stop button, a suspend button, a play button, a fast feed button, and the frame-feed button, respectively. Numeral 108 denotes a time change slide bar. Numeral 109 denotes a parameter sweep screen. Numeral 110 denotes a selection panel. The display unit 12 displays the drawing data on the display screen 100. When the user updates the viewing point information by operating a mouse on the display screen 100, for example, the display unit 12 displays the drawing data, which corresponds to the updated viewing point information and is viewed from the direction indicated by the updated viewing point information, on the display screen 100.

When the user pushes down any of the frame-back button 101, the rewind back button 102, the stop button 103, the suspend button 104, the play button 105, the fast feed button 106, or the frame-feed button 107, the display unit 12 frame-backs, rewinds back, stops, suspends, plays, fast feeds, or frame-feeds the drawing data displayed on the display screen 100, respectively.

The time change slide bar 108 is an operation bar for changing the time, and causing the drawing data corresponding to the changed time to be displayed on the display screen 100. When the user moves the time change slide bar 108 in a right direction in FIG. 3, the time gets fast, and the display unit 12 extracts the drawing data corresponding to the time indicated by a position of the time change slide bar 108 from the drawing data storage unit (illustration is omitted), and displays the extracted drawing data on the display screen 100. When the user moves the time change slide bar 108 in a left direction in FIG. 3, in response of this operation, the time is backed, and the display unit 12 extracts the drawing data corresponding to this backed time from the drawing data storage unit, and displays the extracted drawing data on the display screen 100.

The parameter sweep screen 109 is an operation screen for inputting information for instructing to change the illustrating parameter. An X axis and a Y axis of the parameter sweep screen 109 are axes for indicating the illustrating parameter corresponding to the drawing data, which are displayed on the display screen 100. The selection panel 110 is a panel which is used for selecting the illustrating parameter corresponding to the X axis and the Y axis of the parameter sweep screen 109. When the user selects the illustrating parameter corresponding to the X axis and the Y axis on the selection panel 110, the X axis and the Y axis of the parameter sweep screen 109 are set to the axes indicating the illustrating parameter selected from the selection panel 110. For example, when the user moves, in other words, sweeps the mouse, in a direction of the X axis on the parameter sweep screen 109, the illustrating parameter corresponding to the X axis is changed by a value determined according to a moving quantity of the mouse. Further, when the user sweeps the mouse in a direction of the Y axis on the parameter sweep screen 109, the illustrating parameter corresponding to the Y axis is changed by a value determined according to a moving quantity of the mouse. When the illustrating parameter is changed, the drawing instruction unit 11 transmits the changed the illustrating parameter to the drawing data generation apparatuses 2 in charge of the generation of the drawing data corresponding to the changed illustrating parameter, and causes the drawing data generation apparatuses 2 to generate the drawing data corresponding to the changed illustrating parameter. Then, the display unit 12 displays the drawing data generated by the drawing data generation apparatuses 2 on the display screen 100.

Hereinafter, the distributed processing method of the present embodiment will be described by referring to FIGS. 4 and 5.

Figure 4:
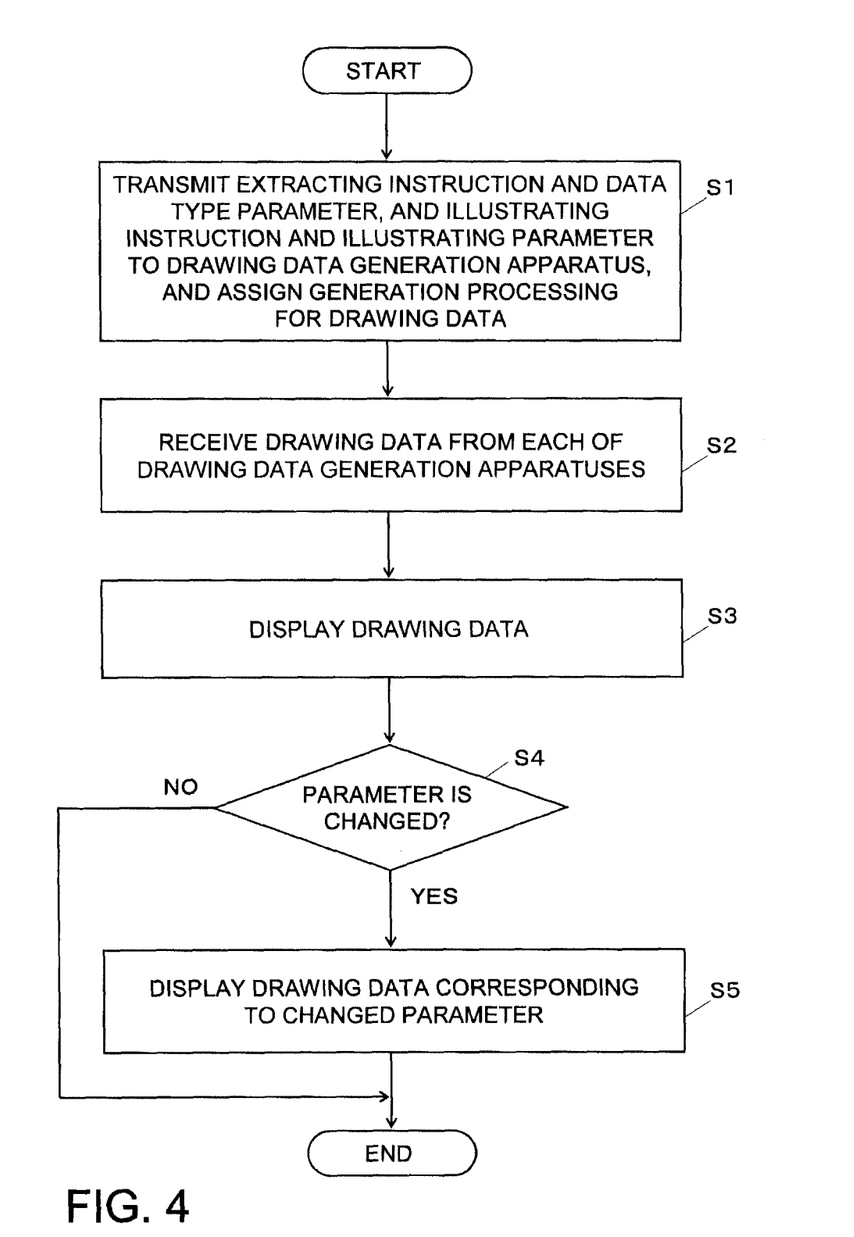
FIG. 4 is a diagram illustrating an example of an operation processing flow chart of the user apparatus.

FIG. 4 is a diagram illustrating an example of an operation processing flow chart of the user apparatus.

First, through the network, the drawing instruction unit 11 transmits the extracting instruction as well as the data type parameter, and the illustrating instruction as well as the illustrating parameter to the drawing data generation apparatus 2, to assign the generation processing of the drawing data to each of the plurality of drawing data generation apparatuses 2 (step S1). Next, the display unit 12 receives the drawing data generated by each of the plurality of drawing data generation apparatuses 2 from each of the plurality of drawing data generation apparatuses 2 (step S2). The display unit 12 displays the drawing data received from each of the plurality of drawing data generation apparatuses 2 (step S3).

Next, the drawing instruction unit 11 determines whether the parameter, in other words, the data type parameter or the illustrating parameter is changed (step S4). When the drawing instruction unit 11 determines that the parameter is not changed (S4, No), the processing of FIG. 4 is completed.

On the other hand, when the drawing instruction unit 11 determines that the parameter is changed (S4, Yes), the display unit 12 displays the drawing data corresponding to the changed parameter (step S5). In step S5, for example, the drawing instruction unit 11 transmits the changed parameter, for example, the illustrating parameter, to the drawing data generation apparatuses 2 in charge of the generation of the drawing data corresponding to the illustrating parameter. In response of this, the display unit 12 receives the drawing data generated by the drawing data generation apparatuses 2 from the drawing data generation apparatuses 2, and displays the received drawing data.

Meanwhile, in step S5, for example, the display unit 12 may extract the drawing data corresponding to the changed parameter, for example, the time information, from the above-described drawing data storage unit, and may display the extracted drawing data.

Figure 5:
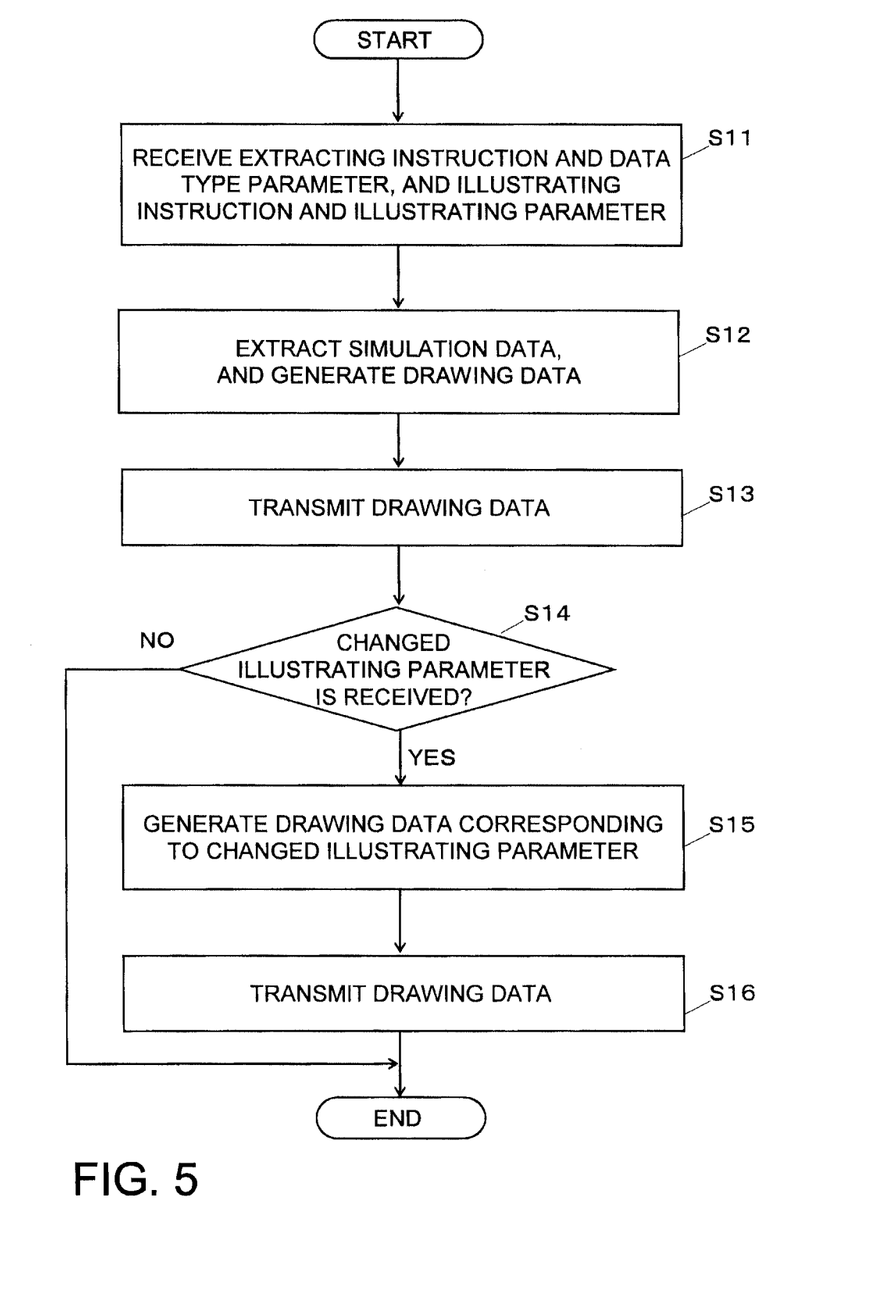
FIG. 5 is a diagram illustrating an example of an operation processing flow chart of the drawing data generation apparatus.

FIG. 5 is a diagram illustrating an example of an operation processing flow chart of each drawing data generation apparatus.

The illustrating instruction execution unit 21 receives the extracting instruction as well as the data type parameter, and the illustrating instruction as well as the illustrating parameter from the user apparatus 1 (step S11). According to the extracting instruction received from the user apparatus 1, the illustrating instruction execution unit 21 extracts the simulation data corresponding to the data type parameter from the simulation data storage unit 4. The illustrating instruction execution unit 21 generates the drawing data corresponding to the illustrating parameter based on the simulation data extracted from the simulation data storage unit 4, and the illustrating parameter received from the user apparatus 1 (step S12).

Next, the drawing data transmission unit 23 transmits the generated drawing data to the user apparatus 1 through the network (step S13). The illustrating instruction execution unit 21 determines whether the changed parameter is received by the user apparatus 1 (step S14). In the example of FIG. 5, it is assumed that the illustrating parameter is changed. When the illustrating instruction execution unit 21 determines that the changed illustrating parameter is not received (S14, No), the processing illustrated in FIG. 5 is completed.

On the other hand, when the illustrating instruction execution unit 21 determines that the changed illustrating parameter is received (S14, Yes), the illustrating instruction execution unit 21 generates the drawing data corresponding to the changed illustrating parameter (step S15). The drawing data transmission unit 23 transmits the drawing data generated by the illustrating instruction execution unit 21 to the user apparatus 1 through the network 3 (step S16).

Figure 6A:
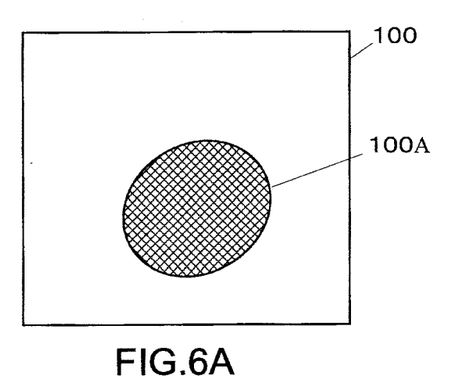
FIGS. 6A, 6B, and 6C are diagrams illustrating a first example of updating the drawing data corresponding to change of a parameter.
Figure 6B:
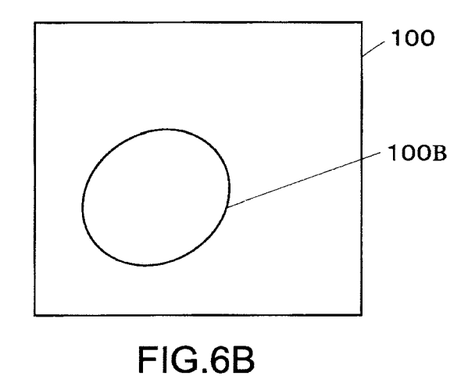
Figure 6C:
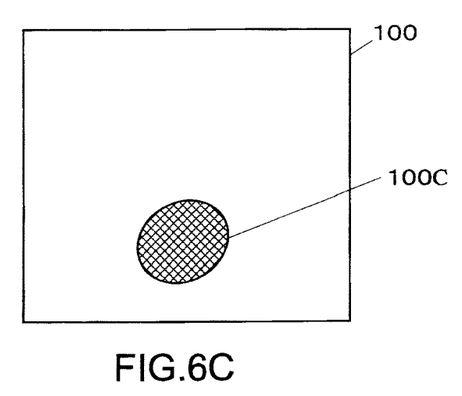

FIGS. 6A, 6B, and 6C are diagrams illustrating a first example of updating the drawing data corresponding to the change of the parameter. In the example of FIGS. 6A, 6B, and 6C, it is assumed that an equivalent surface 100A as illustrated in FIG. 6A is displayed on a display screen 100 of FIG. 3 before the drawing data is updated.

For example, by using the selection panel 110 illustrated in FIG. 3, the user selects the transparency as the X axis, selects the threshold as the Y axis, and sweeps the mouse in a direction in which a value of the X axis increases along the X axis on the parameter sweep screen 109. In the example of FIGS. 6A, 6B, and 6C, it is assumed that the threshold of the equivalent surface is selected as the threshold. In response to this operation, the display unit 12 of the user apparatus 1 displays an equivalent surface 100B, whose transparency is changed, as illustrated in FIG. 6B. In FIG. 6B, by deleting diagonal lines provided on the equivalent surface 100A of FIG. 6A, a difference of the transparency is illustrated.

Further, for example, when the equivalent surface 100A as illustrated in FIG. 6A is displayed on the display screen 100, the user sweeps the mouse in a direction in which a value of the Y axis increases along the Y axis on the parameter sweep screen 109. In response to this operation, the display unit 12 of the user apparatus 1 displays an equivalent surface 100C, whose area size is smaller than an area size of the equivalent surface 100A illustrated in FIG. 6A, as illustrated in FIG. 6C.

Figure 7:
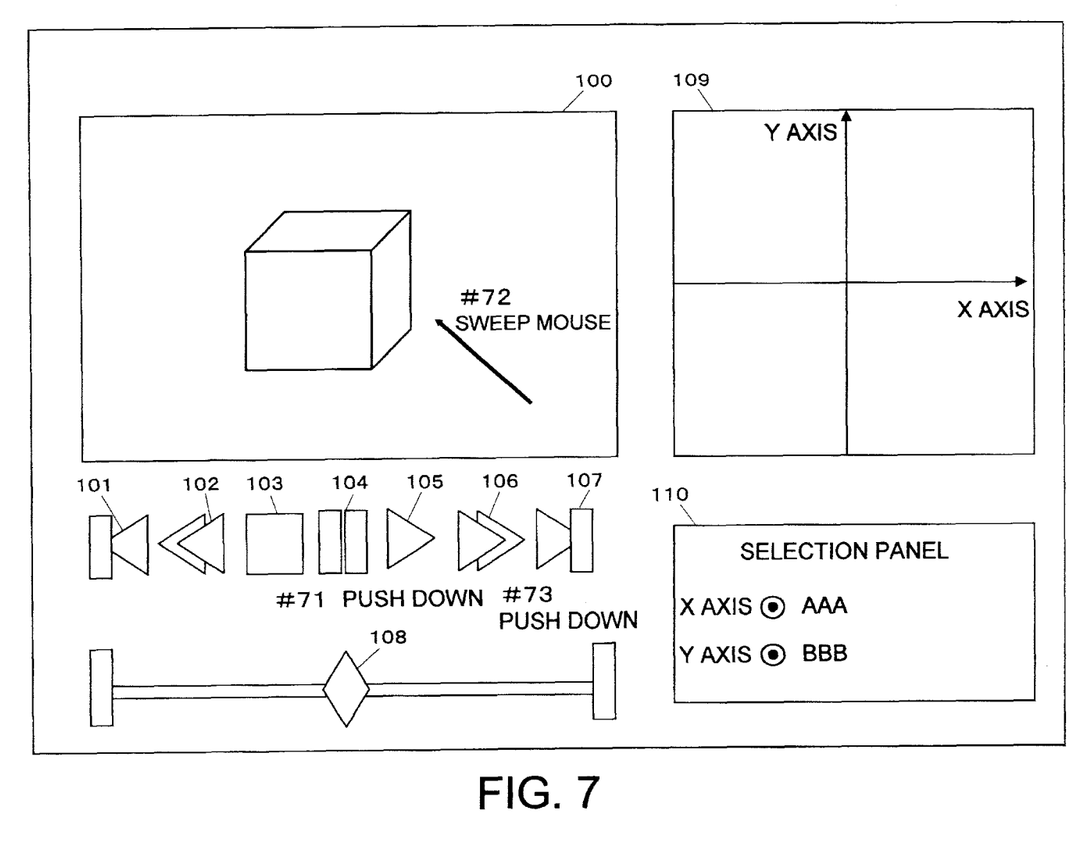
FIG. 7 is a diagram illustrating a second example of updating the drawing data corresponding to change of a parameter.

FIG. 7 is a diagram illustrating a second example of updating the drawing data corresponding to the change of a parameter. In the example of FIG. 7, it is assumed that the drawing data is displayed as a moving image corresponding to elapse of the time on the display screen 100.

In the example of FIG. 7, in response to the elapse of the time, the time change slide bar 108 in FIG. 7 moves in a right direction. During the moving image is displayed, for example, the user pushes down the suspend button 104 at the time t10 (#71). In response to this, the input unit 13 inputs the operation information according to the pushing down operation for the suspend button 104, and the display unit 12 suspends to display the moving image displayed on the display screen 100.

Next, the user sweeps the mouse in a direction indicated by an arrow on the display screen 100 of FIG. 7 (#72). In response to this, the drawing instruction unit 11 of the user apparatus 1 updates the initial viewing point information to the viewing point information corresponding to the direction indicated by the arrow.

In a state that the viewing point information is updated, for example, the user pushes down the frame-feed button 107 (#73). In response to this, the drawing instruction unit 11 transmits the updated viewing point information to the drawing data generation apparatuses 2 in charge of the generation of the drawing data corresponding to the time after the time t11, and causes the drawing data generation apparatuses 2 to generate the drawing data corresponding to the updated viewing point information. Since the frame-feed button 107 is pushed down, the time t11 is the time after the time t10 when the suspend button 104 is pushed down, and, for example, the time t11 is a time obtained by adding a term when the frame-feed button 107 is pushed down to the time t10.

After the above processing, the display unit 12 receives the drawing data corresponding to the updated viewing point information from the drawing data generation apparatuses 2, and frame-feeds the moving image whose viewing point is changed by displaying the received drawing data.

Figure 8:
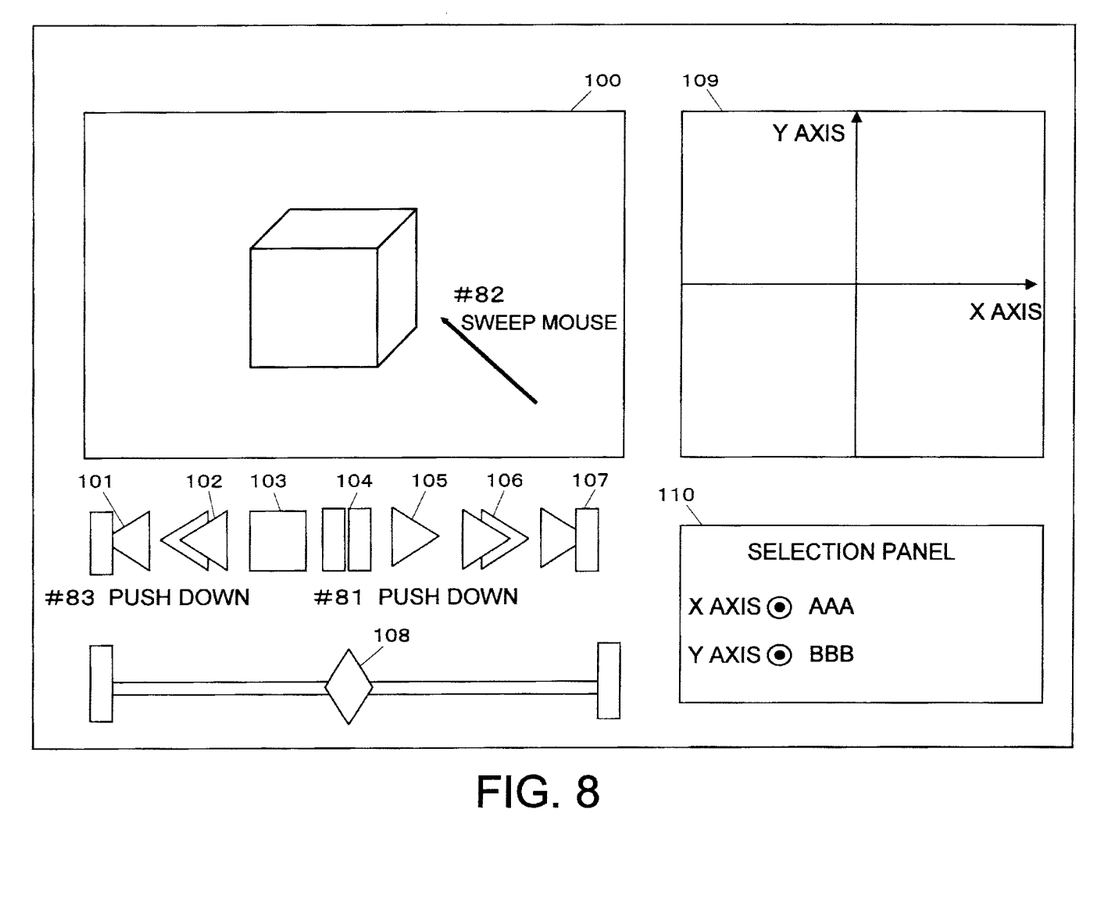
FIG. 8 is a diagram illustrating a third example of updating the drawing data corresponding to change of a parameter.

FIG. 8 is a diagram illustrating a third example of updating the drawing data corresponding to the change of the parameter. In the example of FIG. 8, it is also assumed that the drawing data is displayed as the moving image corresponding to the elapse of the time on the display screen 100.

During the moving image is being displayed, for example, the user pushes down the suspend button 104 at the time t10 (#81). In response to this, the input unit 13 inputs the operation information according to the pushing down operation for the suspend button 104, and the display unit 12 suspends to display the moving image displayed on the display screen 100.

Next, the user sweeps the mouse in a direction indicated by an arrow on the display screen 100 of FIG. 8 (#82). In response to this, the drawing instruction unit 11 of the user apparatus 1 updates the initial viewing point information to a new viewing point information corresponding to the direction indicated by this arrow.

In this state, for example, the user pushes down the frame-back button 101 (#83). In response to this, the drawing instruction unit 11 transmits the updated viewing point information to the drawing data generation apparatuses 2 in charge of the generation of the drawing data corresponding to the time before the time t9, and causes the drawing data generation apparatuses 2 to generate the drawing data corresponding to the updated viewing point information. Since the frame-back button 101 is pushed down, the time t9 is the time before the time t10 when the suspend button 104 is pushed down, and, for example, the time t9 is a time obtained by subtracting a term when the frame-back button 101 is pushed down from the time t9.

After the above processing, the display unit 12 receives the drawing data corresponding to the updated viewing point information from the drawing data generation apparatuses 2, and frame-backs the moving image by displaying the received drawing data in the reverse order of the time information corresponding to the received drawing data.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A distributed processing system comprising:
   a plurality of drawing data generation apparatuses; and
   an information processing apparatus connected to the plurality of drawing data generation apparatuses through a network, the information processing apparatus further comprising:
   a processing assignment unit that transmits a parameter on generation of drawing data to each of the plurality of drawing data generation apparatuses through the network to assign generation processing of the drawing data to each of the plurality of drawing data generation apparatuses;
   a display unit that receives the drawing data generated based on the parameter by each of the plurality of drawing data generation apparatuses through the network, and displaying the received drawing data; and
   a parameter change unit that changes the parameter corresponding to the displayed drawing data,
   wherein the display unit displays a new drawing data corresponding to the changed parameter,
   wherein the parameter on the generation of the drawing data includes time information,
   wherein the processing assignment unit transmits the parameter, that includes the time information other than the time information included in the parameter transmitted to another drawing data generation apparatuses, to each of the plurality of drawing data generation apparatus, and causes each of the plurality of drawing data generation apparatuses to execute the generation processing of the drawing data corresponding to the time information included in the parameter transmitted to the each drawing data generation apparatus, and
   wherein the display unit displays each drawing data received from each of the plurality of drawing data generation apparatuses in order of the time information corresponding to the received drawing data.

2. The distributed processing system according to claim 1,
   wherein the parameter further includes viewing point information indicating which direction the drawing data to be generated is viewed from, and
   wherein the processing assignment unit transmits the parameter, that includes the viewing point information and the time information other than the time information included in the parameter transmitted to another drawing data generation apparatuses, to each of the plurality of drawing data generation apparatus, and causes each of the plurality of drawing data generation apparatuses to execute the generation processing of the drawing data corresponding to the viewing point information and the time information both of which are included in the parameter transmitted to the each drawing data generation apparatus.

3. A distributed processing system comprising:
   a plurality of drawing data generation apparatuses; and
   an information processing apparatus connected to the plurality of drawing data generation apparatuses through a network, the information processing apparatus further comprising:
   a processing assignment unit that transmits a parameter on generation of drawing data to each of the plurality of drawing data generation apparatuses through the network to assign generation processing of the drawing data to each of the plurality of drawing data generation apparatuses;
   a display unit that receives the drawing data generated based on the parameter by each of the plurality of drawing data generation apparatuses through the network, and displaying the received drawing data; and
   a parameter change unit that changes the parameter corresponding to the displayed drawing data,
   wherein the display unit displays a new drawing data corresponding to the changed parameter,
   wherein the parameter on the generation of the drawing data includes time information and a transfer function of an input-output system on the generation of the drawing data, wherein the processing assignment unit transmits the parameter, that includes the same time information and a transfer function other than the transfer function included in the parameter transmitted to another drawing data generation apparatuses, to each of the plurality of drawing data generation apparatus, and causes each of the plurality of drawing data generation apparatuses to execute the generation processing of the drawing data corresponding to the time information and the transfer function both of which are included in the parameter transmitted to the each drawing data generation apparatus, and wherein the display unit displays drawing data corresponding to one or more selected transfer function in the drawing data generated by each of the plurality of drawing data generation apparatuses.

4. The distributed processing system according to claim 3, wherein the parameter further includes viewing point information indicating which direction the drawing data to be generated is viewed from, and wherein the processing assignment unit transmits the parameter, that includes the viewing point information, the same time information, and the transfer function other than the transfer function included in the parameter transmitted to another drawing data generation apparatuses, to each of the plurality of drawing data generation apparatus, and causes each of the plurality of drawing data generation apparatuses to execute the generation processing of the drawing data corresponding to the viewing point information, the time information, and the transfer function all of which are included in the parameter transmitted to the each drawing data generation apparatus.

5. An information processing apparatus connected to a plurality of drawing data generation apparatuses through a network, the information processing apparatus comprising:

a processing assignment unit that transmits a parameter on generation of drawing data to each of the plurality of drawing data generation apparatuses through the network to assign generation processing of the drawing data to each of the plurality of drawing data generation apparatuses;

a display unit that receives the drawing data generated based on the parameter by each of the plurality of drawing data generation apparatuses through the network, and displaying the received drawing data; and a parameter change unit that changes the parameter corresponding to the displayed drawing data, wherein the display unit displays a new drawing data corresponding to the changed parameter, wherein the parameter on the generation of the drawing data includes time information, wherein the processing assignment unit transmits the parameter, that includes the time information other than the time information included in the parameter transmitted to another drawing data generation apparatuses, to each of the plurality of drawing data generation apparatus, and causes each of the plurality of drawing data generation apparatuses to execute the generation processing of the drawing data corresponding to the time information included in the parameter transmitted to the each drawing data generation apparatus, and wherein the display unit displays each drawing data received from each of the plurality of drawing data generation apparatuses in order of the time information corresponding to the received drawing data.

6. A distributed processing method executed in a distributed processing system comprising a plurality of drawing data generation apparatuses and an information processing apparatus, which are connected with each other through a network, the method comprising:

transmitting a parameter on generation of drawing data from the information processing apparatus to each of the plurality of drawing data generation apparatuses through the network, to assign generation processing of the drawing data to each of the plurality of drawing data generation apparatuses;

receiving, at the information processing apparatus, the drawing data generated based on the parameter by each of the plurality of drawing data generation apparatuses through the network;

displaying, at the information processing apparatus, the received drawing data;

changing, at the information processing apparatus, the parameter corresponding to the displayed drawing data; and displaying, at the information processing apparatus, a new drawing data corresponding to the changed parameter, wherein the parameter on the generation of the drawing data includes time information, wherein the information processing apparatus transmits the parameter, that includes time information other than the time information included in the parameter transmitted to another drawing data generation apparatuses, to each of the plurality of drawing data generation apparatus, and causes each of the plurality of drawing data generation apparatuses to execute the generation processing of the drawing data corresponding to the time information included in the parameter transmitted to the each drawing data generation apparatus, and wherein the information processing apparatus displays each drawing data received from each of the plurality of drawing data generation apparatuses in order of the time information corresponding to the received drawing data.

7. The distributed processing method according to claim 6, wherein the parameter further includes viewing point information indicating which direction the drawing data to be generated is viewed from, and wherein the information processing apparatus transmits the parameter, that includes the viewing point information and the time information other than the time information included in the parameter transmitted to another drawing data generation apparatuses, to each of the plurality of drawing data generation apparatus, and causes each of the plurality of drawing data generation apparatuses to execute the generation processing of the drawing data corresponding to the viewing point information and the time information both of which are included in the parameter transmitted to the each drawing data generation apparatus.

8. A distributed processing method executed in a distributed processing system comprising a plurality of drawing data generation apparatuses and an information processing apparatus, which are connected with each other through a network, the method comprising:

transmitting a parameter on generation of drawing data from the information processing apparatus to each of the plurality of drawing data generation apparatuses through the network, to assign generation processing of the drawing data to each of the plurality of drawing data generation apparatuses;

receiving, at the information processing apparatus, the drawing data generated based on the parameter by each of the plurality of drawing data generation apparatuses through the network;

displaying, at the information processing apparatus, the received drawing data;

changing, at the information processing apparatus, the parameter corresponding to the displayed drawing data; and displaying, at the information processing apparatus, a new drawing data corresponding to the changed parameter, wherein the parameter on the generation of the drawing data includes time information and a transfer function of an input-output system on the generation of the drawing data, wherein the information processing apparatus transmits the parameter, that includes the same time information and a transfer function other than the transfer function included in the parameter transmitted to another drawing data generation apparatuses, to each of the plurality of drawing data generation apparatus, and causes each of the plurality of drawing data generation apparatuses to execute the generation processing of the drawing data corresponding to the time information and the transfer function both of which are included in the parameter transmitted to the each drawing data generation apparatus, and wherein the information processing apparatus displays drawing data corresponding to one or more selected transfer function in the drawing data generated by each of the plurality of drawing data generation apparatuses.

* * * * *

UNITED STATES PATENT AND TRADEMARK OFFICE
CERTIFICATE OF CORRECTION

PATENT NO. : 8,473,716 B2  
APPLICATION NO. : 12/832349  
DATED : June 25, 2013  
INVENTOR(S) : Masahiro Watanabe et al.

Page 1 of 1

It is certified that error appears in the above-identified patent and that said Letters Patent is hereby corrected as shown below:

Title Page Col. 2 (Other Publications), Line 11, Delete "LLIC" and insert -- LIC --, therefor.

Signed and Sealed this  
Fifteenth Day of October, 2013

Teresa Stanek Rea  
*Deputy Director of the United States Patent and Trademark Office*